(12) United States Patent
Kim et al.

(10) Patent No.: US 8,989,209 B2
(45) Date of Patent: Mar. 24, 2015

(54) METHOD AND APPARATUS FOR TRANSMITTING/RECEIVING IN MOBILE WIRELESS NETWORK

(75) Inventors: Keun Young Kim, Seongnam-si (KR); Dong Hyun Ahn, Daejeon (KR); Wooram Shin, Daejeon (KR); Choongil Yeh, Daejeon (KR); Jihyung Kim, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 607 days.

(21) Appl. No.: 13/334,932

(22) Filed: Dec. 22, 2011

(65) Prior Publication Data

US 2012/0163257 A1 Jun. 28, 2012

(30) Foreign Application Priority Data

Dec. 23, 2010 (KR) ........................ 10-2010-0133621

(51) Int. Cl.
*H04L 12/413* (2006.01)
*H04W 74/08* (2009.01)
*H04L 29/06* (2006.01)
*H04W 56/00* (2009.01)
*H04L 1/16* (2006.01)

(52) U.S. Cl.
CPC ...... *H04W 74/0808* (2013.01); *H04W 74/0825* (2013.01); *H04W 74/0816* (2013.01); *H04L 63/10* (2013.01); *H04W 56/00* (2013.01); *H04L 1/16* (2013.01)
USPC ............ 370/445; 370/324; 370/350; 370/503

(58) Field of Classification Search
None
See application file for complete search history.

(56) References Cited

U.S. PATENT DOCUMENTS

| | | | | |
|---|---|---|---|---|
| 7,529,265 B1 * | 5/2009 | Nicholas | ....................... | 370/445 |
| 2002/0105970 A1 * | 8/2002 | Shvodian | ....................... | 370/468 |
| 2003/0174664 A1 * | 9/2003 | Benveniste | .................... | 370/317 |
| 2004/0008627 A1 * | 1/2004 | Garg et al. | .................... | 370/235 |
| 2004/0240426 A1 * | 12/2004 | Wu et al. | ....................... | 370/350 |
| 2005/0025176 A1 | 2/2005 | Ko et al. | | |
| 2005/0185666 A1 * | 8/2005 | Raya et al. | .................... | 370/461 |
| 2007/0086341 A1 * | 4/2007 | Ye | .................. | 370/230 |
| 2008/0144493 A1 * | 6/2008 | Yeh | ................. | 370/230 |
| 2008/0151860 A1 * | 6/2008 | Sakoda et al. | ................ | 370/348 |
| 2008/0222303 A1 * | 9/2008 | Archer et al. | ................. | 709/238 |
| 2009/0007141 A1 * | 1/2009 | Blocksome et al. | .......... | 719/315 |
| 2009/0067396 A1 * | 3/2009 | Fischer | ......................... | 370/338 |
| 2012/0028573 A1 * | 2/2012 | Chu et al. | ........................ | 455/39 |

FOREIGN PATENT DOCUMENTS

KR 10-0570830 4/2006

OTHER PUBLICATIONS

IEEE Std 802.11™-2007.

* cited by examiner

*Primary Examiner* — Faruk Hamza
*Assistant Examiner* — Andrew Oh
(74) *Attorney, Agent, or Firm* — Staas & Halsey LLP

(57) ABSTRACT

In a mobile wireless network system including a plurality of nodes communicating with each other, a node attempting to transmit data finds useable resources through performing carrier sensing on packet data unit (PDU) slots and transmits data through the found resources. A node attempting to receive data finds useable resource through performing carrier sensing on acknowledge (ACK) slots and receives data through the found resources.

18 Claims, 11 Drawing Sheets

METHOD AND APPARATUS FOR
TRANSMITTING/RECEIVING IN MOBILE
WIRELESS NETWORK

CROSS-REFERENCE TO RELATED APPLICATION

This application claims priority to and the benefit of Korean Patent Application No. 10-2010-0133621 filed in the Korean Intellectual Property Office on Dec. 23, 2010, the entire contents of which are incorporated herein by reference.

BACKGROUND OF THE INVENTION (a) Field of the Invention

The present invention relates to network access. More particularly, the present invention relates to a method and apparatus for transmitting and receiving data at each node in a mobile wireless network.

(b) Description of the Related Art

A typical mobile wireless network system, for example, a wireless mesh network or a mobile Ad-hoc network system, may use a carrier sense multiple access with collision avoidance (CSMA/CA) based access control scheme. The CSMA/CA determines whether or not a respective wireless media is in use through carrier sensing. When it is determined that a respective wireless media is in use, the CSMA/CA transmits data after random backoff. The CSMA/CA also prevents a hidden node problem through exchanging a request to send a request-to-send (RTS) message and a clear-to-send (CTS) message.

The CSMA/CA-based access control scheme basically assumes that users are not synchronized. Furthermore, the CSMA/CA-based access control scheme has an exposed node problem due to collision with an acknowledgement (ACK) signal.

In addition to the CSMA/CA-based access control scheme, an EBTT-based access control method has been introduced. Here, EBTT stands for election based transmission timing. The EBTT-based access control method uses election-based transmission timing to control access in a mesh system. The EBTT-based access control method is not an access control scheme based on synchronization. Accordingly, the EBTT-based access control method also has an exposed node problem like the CSMA/CA access control scheme.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for effectively transmitting and receiving data at nodes in a mobile wireless network system.

The present invention has been made in another effort to provide a method and apparatus for effectively transmitting and receiving data at nodes based on synchronization in a mobile wireless network system.

An exemplary embodiment of the present invention provides a method for transmitting data at a node in a mobile wireless network system including a plurality of nodes. The method may includes performing carrier sensing for finding empty acknowledgement (ACK) slots in one frame that includes a preamble, a plurality of packet data unit (PDU) slots, a plurality of ACK slots, a plurality of request-to-send (RTS) slots, and a plurality of clear-to-send (CTS) slots, determining positions of PDU slots available for data transmission based on the carrier sensing result, and transmitting data through the PDU slots.

Another embodiment of the present invention provides a method for receiving data at a node in a mobile wireless network system including a plurality of nodes. The method may include finding an empty packet data unit (PDU) slot through sensing PDU slots in one frame that includes a preamble, a plurality of PDUs, a plurality of acknowledgement (ACK) slots, a plurality of request-to-send (RTS) slots, and a plurality of clear-to-send (CTS) slots, determining positions of PDU slots available for receiving data based on the carrier sensing result, and receiving data through the PDU slots at the determined positions.

Yet another embodiment of the present invention provides a transmitting apparatus of a mobile wireless network system including a plurality of nodes. The transmitting apparatus may includes a carrier sensing unit for finding an empty acknowledgement (ACK) slot through sensing ACK slots in one frame that includes a preamble, a plurality of packet data unit (PDU) slots, a plurality of acknowledgement (ACK) slots, a plurality of request-to-send (RTS) slots, and a plurality of clear-to-send (CTS) slots, a data position determining unit for determining positions of PDU slots available for data transmission based on the carrier sensing result, wherein the positions of PDU slots include positions of PDU slots corresponding to empty ACK slots, and a data transmission unit for transmitting data through the PDU slots available for data transmission.

Yet another embodiment of the present invention provides a receiving apparatus of a mobile wireless network system including a plurality of nodes. The receiving apparatus may include a carrier sensing unit for finding an empty packet data unit (PDU) slot through sensing PDU slots in one frame that includes a preamble, a plurality of PDU slots, a plurality of acknowledgement (ACK) slots, a plurality of request-to-send (RTS) slots, and a plurality of clear-to-send (CTS) slots, and a data receiving position determining unit for determining positions of PDU slots available for receiving data based on the carrier sensing result, and receiving data through the PDU slots at the determined positions.

DETAILED DESCRIPTION OF THE EMBODIMENTS

Figure 1:
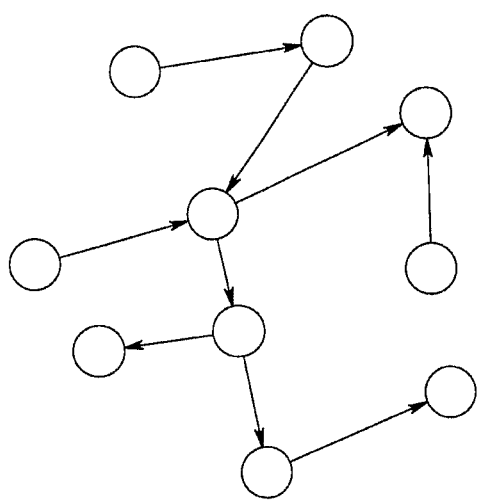
FIG. 1 illustrates data transmission between nodes in a mobile wireless network in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a method and apparatus for controlling access in accordance with an embodiment of the present invention will be described with reference to the accompanying drawings.

FIG. 1 illustrates data transmission between nodes in a mobile wireless network in accordance with an exemplary embodiment of the present invention. In accordance with an exemplary embodiment of the present invention, a mobile wireless network system is not a centralized control system unlike a base station that controls resource allocation. The mobile wireless network system may include a plurality of nodes that distributively perform resource request and allocation. For example, the mobile wireless network system may be a wireless mesh network or a mobile Ad-hoc network.

As shown in FIG. 1, a mobile wireless network system in accordance with an exemplary embodiment of the present invention may include a plurality of nodes. Each node may communicate with neighboring nodes. The neighboring nodes may denote nodes adjacent to a respective node. A logical link may be established between the respective node and neighboring nodes, and data may be exchanged between the respective node and the neighboring nodes through the logical link.

Figure 2:
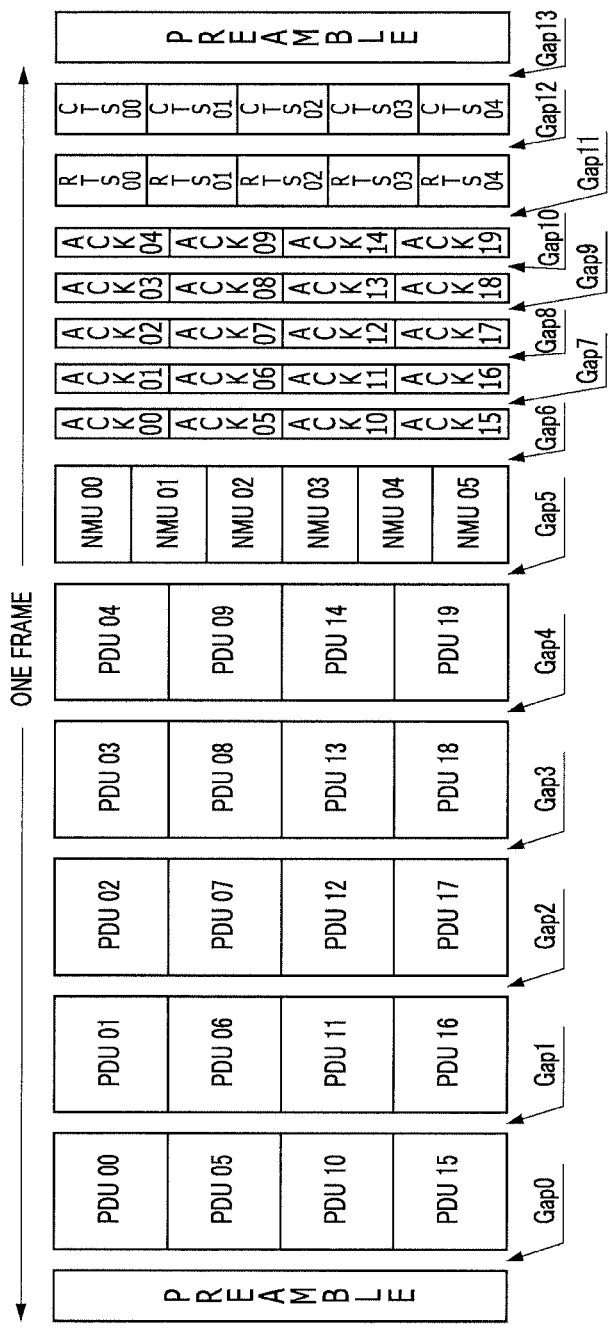
FIG. 2 illustrates a structure of a frame in accordance with an exemplary embodiment of the present invention.

FIG. 2 illustrates a structure of a frame in accordance with an exemplary embodiment of the present invention.

In accordance with an exemplary embodiment of the present invention, a radio resource may be an orthogonal frequency-division multiple access (OFDMA)-based radio resource. The radio resource may be divided into a time domain and a frequency domain. The radio resources are arranged along a time axis and a frequency axis. One of resource regions may include a plurality of resource units, and each resource unit may include one subcarrier and one symbol such as an orthogonal frequency-division multiplexing (OFDM) symbol.

In accordance with an exemplary embodiment of the present invention, a frame may include a preamble, a plurality of packet data unit slots PDU00 to PDU 19, and a plurality of ACK slots ACK00 to ACK19, as shown in FIG. 2. The frame may further include request-to-send (RTS) slots RTS00 to RTS04 and clear-to-send (STS) slots CTS00 to CTS04.

In accordance with an exemplary embodiment of the present invention, the frame may include N PDU slots and N ACK slots where N is a positive integer. Accordingly, the frame may include the same number of PUD slots and ACK slots. After the ACK slots, L RTS slots may be arranged where L is a positive integer. After the RTS slots, L CTS slots may be arranged. Accordingly, the frame may include the same number of RTS slots and CTS slots. A gap time may be defined between adjacent slots. The gap time may be a time for not transmitting data in consideration of an RF switching time and a decoding time. The gap time may denote a period in which data transmission is not allowed in consideration of transmitting/receiving switching and decoding.

The preamble is a space for transmitting a signal for synchronization between nodes or for measuring signal strength. The PDU slots PDU00 to PDU 19 may each be a slot or a channel user for transmitting user data. The ACK slots ACK00 to ACK19 may each be a slot or a channel for informing success or failure in receiving a corresponding PDU. The RTS slots RTS00 to RTS04 may each be a slot or a channel used for a PDU occupation request. The CTS slots CTS00 to CTS04 may each be a slot or a channel used for allowing PDU occupation using the RTS slots.

The vertical axis of such a frame may denote a subcarrier sequence, and the horizontal axis may denote an OFDMA symbol sequence. A slot may function as an individual communication channel. Accordingly, each node may use slots to transmit or receive messages. Furthermore, each node may simultaneously process a plurality of slots due to OFDMA characteristics. Therefore, the frame in accordance with an exemplary embodiment of the present invention may support a multi-channel wireless Ad-hoc network supporting multi-channel random multiple access and multi-hop connection.

In accordance with an exemplary embodiment of the present invention, the mobile wireless network system transmits and receives data using the frame described above. The mobile wireless network system may employ carrier sense multiple access with collision avoidance (CSMA/CA), and it is assumed that the PDU slots, the ACK slots, the RTS slots, and the CTS slots are synchronized.

In the mobile wireless network system, each node may sense a PDU slot and an ACK slot and determine whether or not the sensed PDU slot is in use based on the sensing result. When there is no empty ACK slot at a time to transmit data, a respective node may wait until an empty ACK slot is found and perform a random backoff procedure. When there is an empty ACK slot after the random backoff procedure, an RTS slot is randomly selected and an RTS PDU is transmitted through the selected RTS slot. The RTS PDU may be an RDU occupation request because there is data to be transmitted.

When there is an empty ACK slot at a time to transmit data, an RTS slot may be randomly selected without performing a random backoff procedure.

A receiving node, which is a node receiving an RTS PDU, may select a CTS slot forming a respective pair and transmit a CTS PDU. The receiving node responds corresponding to the RTS PDU.

A transmitting node, which is a node transmitting an RTS PDU, may perform a random backoff procedure when there is no response to the CTS PDU from the receiving node after transmitting the RTS PDU.

After finishing RTS/CTS exchange as described above, the transmitting node transmits data through a respective PDU slot and transmits a response through an ACK slot corresponding to each transmitted PDU slot. For example, when data is transmitted through a PDU slot PDU00, an ACK response may be transmitted through a corresponding ACK slot ACK00.

Hereinafter, an access control method of a transmitting node, which is a method for transmitting data, in accordance with an exemplary embodiment of the present invention will be described.

Figure 3:
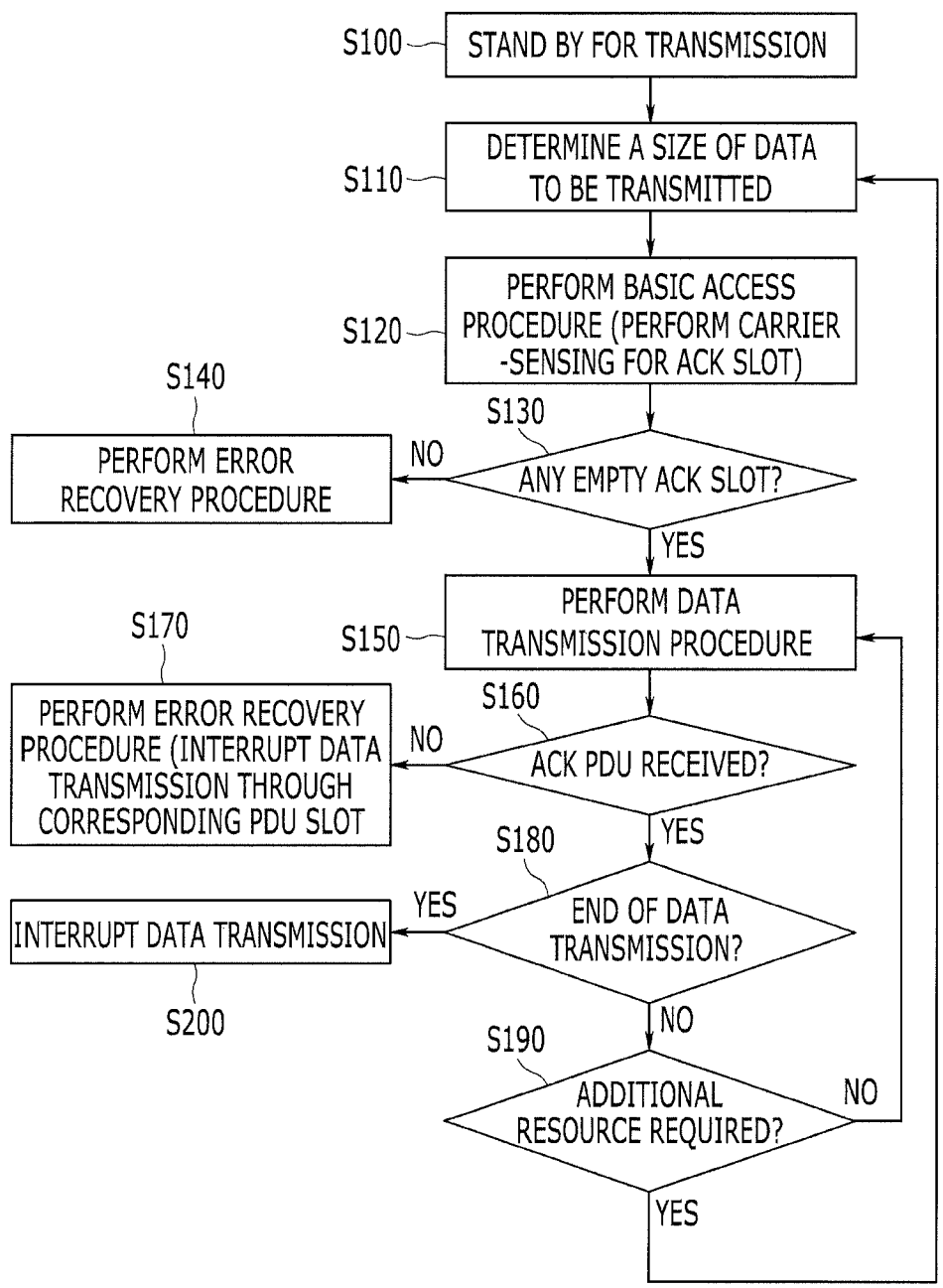
FIG. 3 is a flowchart illustrating a method for transmitting data at a transmitting node in accordance with an exemplary embodiment of the present invention.

FIG. 3 is a flowchart illustrating a method for transmitting data at a transmitting node, in accordance with an exemplary embodiment of the present invention.

Referring to FIG. 3, the transmitting node, which is a node transmitting data, may determine a size of data to be transmitted at steps S100 and S110. The transmitting node may perform a basic access procedure that performs carrier sensing for finding resources to transmit the data at step S120.

A physical layer may provide the carrier sensing procedure of the base access procedure. The transmitting node may detect a position of an empty slot from a radio resource through the carrier sensing procedure. In this procedure, a hidden node problem and an exposed node problem may arise.

In order to solve the hidden node problem and the exposed node problem in accordance with an exemplary embodiment of the present invention, a node that wants to transmit data may perform carrier sensing for an ACK slot, and a node that wants to receive data may perform carrier sensing for a PDU slot. That is, carrier sensing may be performed for an ACK slot and a PDU slot. A carrier sensing result for the ACK slot may be used for transmitting the RTS PDU. A carrier sensing result for the PDU slot may be used for transmitting the CTS PDU.

Next, the transmitting node may perform a random backoff procedure or a data transmission procedure based on the carrier sensing result.

Particularly, the transmitting node may determine whether there is an empty ACK slot based on the carrier sensing result for the ACK slot and determine whether or not it is possible to receive an ACK based on the determination result at step S130.

When it is impossible to receive ACK, for example, when there is no empty ACK slot, the random backoff procedure may be performed for waiting for a frame having an empty ACK slot at step S140.

The random backoff procedure may be referred to as an error recovery procedure. The random backoff procedure may delay transmission for a predetermined random backoff time until an empty slot appears. In this manner, collision with other nodes that delay transmission may be prevented. When a node wants to transmit data, the random backoff procedure may be performed when there is no empty ACK slot. The random backoff procedure may be performed when a CTS PDU response is not received after transmitting an RTS PDU slot.

The backoff time may be determined as below in accordance with an exemplary embodiment of the present invention.

$$\text{Backoff time } (T_{Backoff}) = \text{random}(\ ) \times \text{frametime} \qquad \text{[Equation 1]}$$

In Equation 1, random ( ) denotes a function for randomly generating a natural number between [0, CW]. CW denotes a natural number between a minimum value (aCWmin) and a maximum value (aCWmax). The value of random ( ) for each node is independent. The frametime denotes a time of one frame.

For example, an initial value of CW is a minimum value (aCWmin) according to 802.11. Each node may have multiple retransmission attempts. When there is no CTS PDU response after transmitting an RTS PDU, the value of CW increases up to the maximum value (aCWmax) by $2^{CW-1}$. When the CW value reaches the maximum value (aCWmax), the maximum CW value (aCWmax) may be maintained until it is reset.

When data transmission is performed through a PDU slot or when the number of retransmission attempts exceeds the maximum number of attempts, the CW value may be reset to a minimum value (aCWmin). The number of retransmission attempts may be set up as "0" after receiving a CTS PDU as a response to an RTS PDU, after receiving an ACK response for the data transmission, or after transmitting broadcast/multicast data.

Such a random backoff procedure may be performed when there is no empty ACK slot or when the receipt of a CTS PDU has failed. The failure of receiving a CTS PDU may be determined when a CTS PDU is not received within a respective frame after transmitting an RTS PDU. In this case, a transmission failure may be expected. This case will be described in detail hereinafter.

Figure 4:
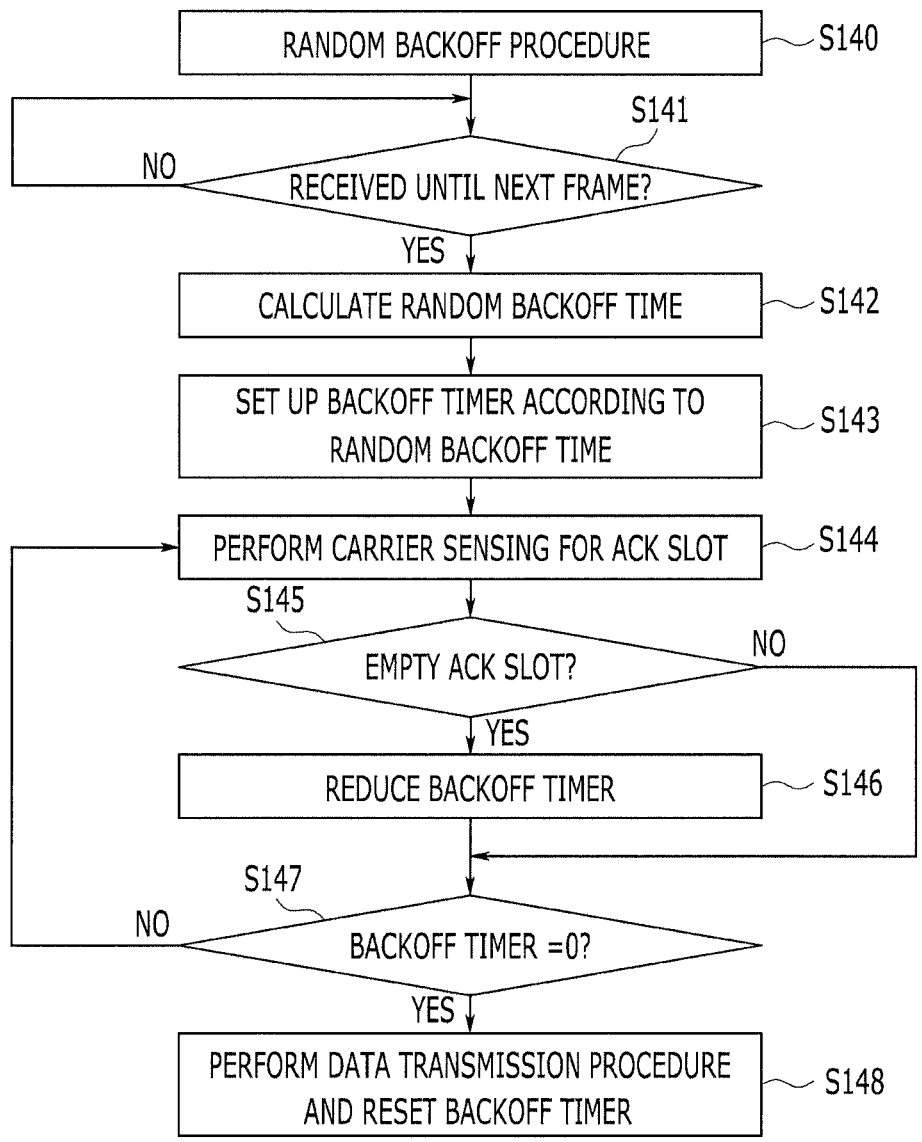
FIG. 4 is a flowchart illustrating a random backoff procedure in accordance with an exemplary embodiment of the present invention.

FIG. 4 is a flowchart illustrating a random backoff procedure in accordance with an exemplary embodiment of the present invention.

When there is no ACK slot, the random backoff procedure may be performed as described above. In this case, the random backoff procedure may be performed after standing by transmission until a frame having an empty ACK slot is available at step S141. After the random backoff procedure begins, a transmitting node may set up a backoff timer based on a random backoff time ($T_{backoff}$) that is calculated as in Equation 1 at steps S142 and S143. When the backoff timer is set to a random backoff time, a determination may be made as to whether or not an empty ACK slot is included in a frame through carrier sensing at steps S144 and S145. When an empty ACK slot is included in a respective frame based on the determination result, the time of the backoff timer is reduced by as much as a time of one frame from a predetermined random backoff time at step S146. A determination may be made as to whether or not the time of the backoff timer is, for example, "0" at step S147.

When an empty ACK slot is not included in the respective frame at the step S145, a determination may be made as to whether or not the time of the backoff timer is "0" at step S147. When the time of the backoff timer is not "0", carrier sensing may be performed again for the next frame to determine whether or not an empty ACK slot is included in the next frame. Based on the determination result, the time of the backoff timer may be reduced. That is, when there is no empty ACK slot before the time of the backoff timer becomes "0", the time of the backoff timer is not reduced. The time of the backoff timer begins to be reduced from a frame having an empty ACK slot.

When the empty ACK slot is included or not included in the frame, a determination may be made as to whether or not the time of the backoff timer is "0". When the time of the backoff timer is "0", the transmitting node may perform a data transmission procedure at step S148. That is, the transmitting node may transmit an RTS PDU at a frame where the time of the backoff timer becomes "0" and perform a data transmission procedure that transmits data according to the CTS PDU. According to the data transmission procedure, the backoff timer is reset when the data transmission is performed through the PDU slot. That is, when the data transmission is performed without receiving an ACK PDU, the backoff timer may be reset. That is, the backoff timer may be reset to a CW minimum value (aCWmin), and the number of retransmission attempt times may be reset to "0".

Among a plurality of nodes that perform the random backoff procedure as described above, a node selecting the shortest backoff time wins the competition. That is, a winning node among a plurality of nodes delaying transmission through the random backoff procedure is a node that calculates a backoff time by selecting the smallest CW.

When there is more than one empty ACK slot included in a respective frame based on the carrier sensing result at step S130 of FIG. 3, a data transmission procedure is performed as follows at step S150.

Figure 5:
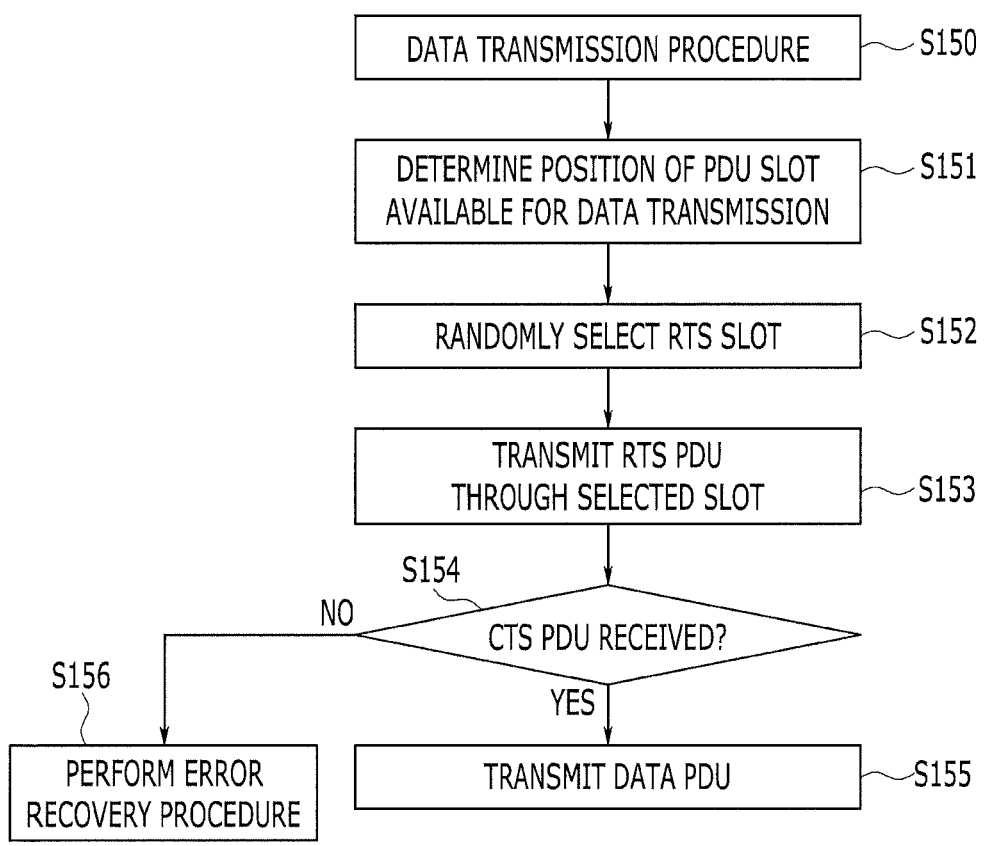
FIG. 5 is a flowchart that illustrates a data transmission procedure in accordance with an exemplary embodiment of the present invention.

FIG. 5 is a flowchart that illustrates a data transmission procedure in accordance with an exemplary embodiment of the present invention.

As shown in FIG. 5, the transmitting node randomly selects an RTS slot in a respective frame when there is an empty ACK slot. The transmitting node transmits an RTS PDU through the selected RTS slot. The TRS PDU indicates that there is data to transmit.

Before transmitting the RTS PDU, the transmitting node determines a position of a PDU slot for data transmission using the following information at step S151. Particularly, the transmitting node considers positions of PDU slots for transmitting data, which are obtained from the carrier sensing result for the ACK slot within one frame. That is, the transmitting node determines a position of a PDU slot to transmit data from positions of PDU slots corresponding to the empty ACK slot. The transmitting node may exclude all frequency domain positions within a current time domain.

After determining positions of the PDU slots available for data transmission as described above, an RTS slot is randomly selected at step S152. The transmitting node transmits an RTS PDU through the selected RTS slot at step S153. The RTS PDU indicates that there is data to be transmitted. The RTS PDU includes information on a size of data and a position of a PDU slot for data transmission. Such information may be transmitted as a bitmap.

The transmitting node transmits data through a PDU slot when a CTS PDU is received within a corresponding frame after transmitting an RTS PDU. That is, when the transmitting node receives a CTS PDU corresponding to the RTS PDU after transmitting the RTS PDU, the transmitting node transmits data through PDU slots available for data transmission at steps S154 and S155.

When the transmitting node does not receive the CTS PDU within a corresponding frame after transmitting the RTS PDU, the transmitting node may perform a random backoff procedure, which is an error recovery procedure, at step S156. Particularly, the transmitting node interrupts the data transmission and performs the random backoff procedure as shown in FIG. 4.

The transmitting node transmits data through the PDU slots available for data transmission and receives an ACK PDU through an ACK slot at a position corresponding to the PDU slots. In this manner, data is transmitted or received between the transmitting node and the receiving node.

Meanwhile, the error recovery procedure is performed when the transmitting node does not receive an ACK PDU after data transmission at steps S160 and S170. When communication is being performed normally by receiving an ACK PDU and data transmission is not completed, the transmitting node determines whether or not additional resources are required for data transmission at steps S180 and S190. When additional resources are required, the transmitting node determines a size of data to be transmitted at step S110 again and repeats the steps S120 to S190.

Meanwhile, the transmitting node interrupts data transmission when data transmission is completed. S200.

Hereinafter, a method for access control at a receiving node will be described. The method for access control may be a method for receiving data.

Figure 6:
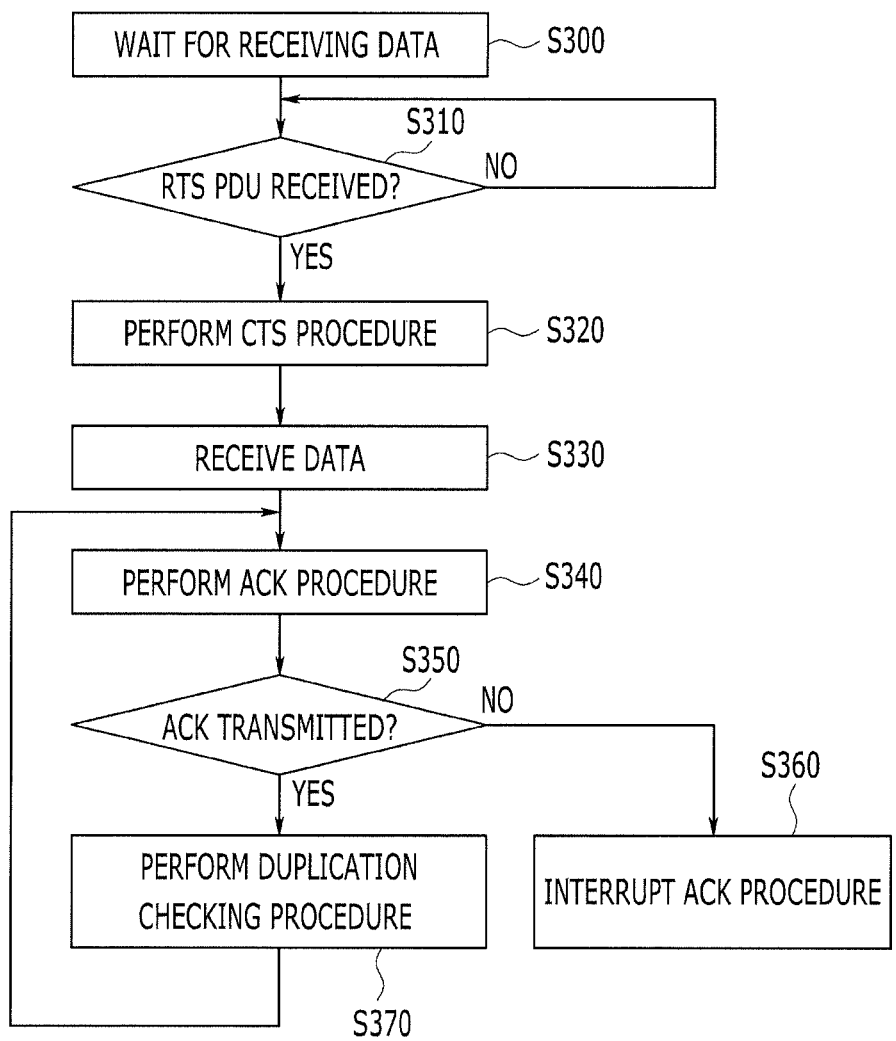
FIG. 6 is a flowchart that illustrating a method for receiving data at a receiving node in accordance with an exemplary embodiment of the present invention.

FIG. 6 is a flowchart that illustrates a method for receiving data at a receiving node in accordance with an exemplary embodiment of the present invention.

As shown in FIG. 6, a receiving node, which is a node waiting to receive data, determines whether an RTS PDU is received or not at steps S300 and S310.

After receiving an RTS PDU, the receiving node checks an address included in the RTS PDU. Based on the address, the receiving node determines whether the received RTS PDU was transmitted to itself or not. When the received RTS PDU was transmitted to itself, the receiving node transmits a CTS PDU that allows a PDU occupation request using the RTS slot within the same frame. That is, a CTS procedure is performed at step S320.

Figure 7:
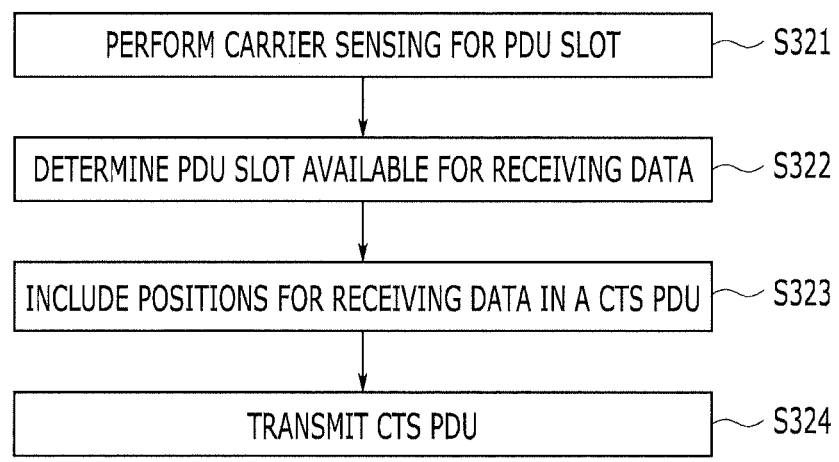
FIG. 7 is a flowchart that illustrates a CTS procedure in accordance with an exemplary embodiment of the present invention.

FIG. 7 is a flowchart that illustrates a CTS procedure in accordance with an exemplary embodiment of the present invention.

As shown in FIG. 7, a receiving node receiving an RTS PDU finds empty PDU slots by performing carrier sensing at step S321.

The receiving node selects PDU slots that can receive data based on the found empty PDU slots. In this case, the receiving node determines PDU slots for receiving data based on the size of data to be transmitted from the transmitting node and position of PDU slots available for data transmission, which are included in the received RTS PDU, and based on positions of empty slots obtained according to the carrier sensing at step S322. The receiving node excludes all frequency domains within a time domain in which the receiving node is currently transmitting.

After determining PDU slots for receiving data, the receiving node includes information on the positions of determined PDU slots in a CTS PDU at step S323. Then, the receiving node includes a receiving ID at a CTS PDU and transmits the CTS PDU to the transmitting node at step S324. The positions for receiving data may be processed as a bitmap and included in the CTS PDU.

Here, the positions of the CTS slot for transmitting a CTS PDU are a region that forms a pair with a received RTS slot. For example, a CTS PDU is transmitted through the CTS 01 slot when an RTS PDU is received through the RTS 01 slot in FIG. 1. The CTS PDU includes a receiving ID and a data transmission position. The receiving ID of the CTS PDU is obtained from a transmitting ID of an RTS PDU.

When the CTS PDU is transmitted through the CTS procedure as described above, a node receiving the CTS PDU performs data transmission as described above. When a node does not receive a CTS PDU within the same frame after receiving the RTS PDU, the node considers it as failure of transmitting RTS PDU and performs the random backoff procedure.

After performing the CTS procedure, the receiving node receives data from the transmitting node at step S330 and performs an ACK procedure according to the received data at step S340, as shown in FIG. 6. That is, the receiving node receives data through a PDU slot at a data receiving position and performs an ACK procedure for informing the transmitting node that data is normally received.

Particularly, a receiving node that successfully receives unicast data transmits an ACK PDU with a PDU slot unit. That is, the receiving node transmits an ACK PDU for every received PDU, and a position of an ACK slot for transmitting ACK PDU is a position corresponding to the received PDU slot. For example, when a PDU is received through PDU 01 slot in FIG. 1, an ACK PDU is transmitted through an ACK 01 slot. Such ACK PDU transmission is performed within a frame receiving data.

When it has failed to receive data at some PDU slots, the receiving node does not transmit an ACK PDU, determines that resources for a corresponding PDU slot have been released, and interrupts the ACK procedure at steps S350 and S360.

The receiving node may not sequentially receive PDUs or may receive a duplicated PDU. Accordingly, the receiving node performs a search procedure or a PDU discard procedure for a PDU that is not yet received or for a duplicated PDU, as shown in FIG. 6. Such a procedure may be referred to as a duplication checking procedure at step S370.

When a data PDU is successfully received, the receiving node transmits an ACK PDU in order to inform of success in receiving data. When the transmitting node fails to receive an ACK PDU, the transmitting node may request resources again through a basic access procedure. In this case, the data PDU is retransmitted. Accordingly, the same data may be received repeatedly. The receiving node discards duplicated data through a duplication checking procedure.

Particularly, the receiving node checks a receiving address and a sequence number of a received data PDU and determines whether or not a data PDU having the same receiving address and the same sequence number is included in PDUs transmitted with the same receiving address. When there is a data PDU having the same sequence number, the receiving node determines that the currently received data PDU is duplicated data and deletes the corresponding data PDU.

The receiving node checks a sequence number of a received data PDU and determines that data PDUs are not sequentially received when the current sequence number is not in order with previous sequence numbers. In this case, the receiving node can request the transmitting node to transmit a corresponding data PDU.

Meanwhile, various errors may be generated in transmitting and receiving data at the transmitting node and the receiving node. When an error is generated, a node attempting data transmission through a PDU slot performs an error recovery procedure. Conditions for determining error generation are as follows.

1) Failure in receiving a CTS PDU within a respective frame after transmitting an RTS PDU.

2) Failure in receiving an ACK PDU within a respective frame after transmitting a data PDU.

When it has failed to receive a CTS PDU, a node transmitting data performs the random backoff procedure.

When it has failed to receive an ACK PDU, a transmitting node transmitting data releases resource allocation for a PDU slot where an ACK PDU is not received and transmits data through other remaining PDU slots. Alternatively, the transmitting node performs a basic access procedure when a PDU slot is additionally required.

Hereinafter, a transmitting apparatus for performing the above-described transmission method and a receiving apparatus for performing the above-described receiving method will be described.

Figure 8:
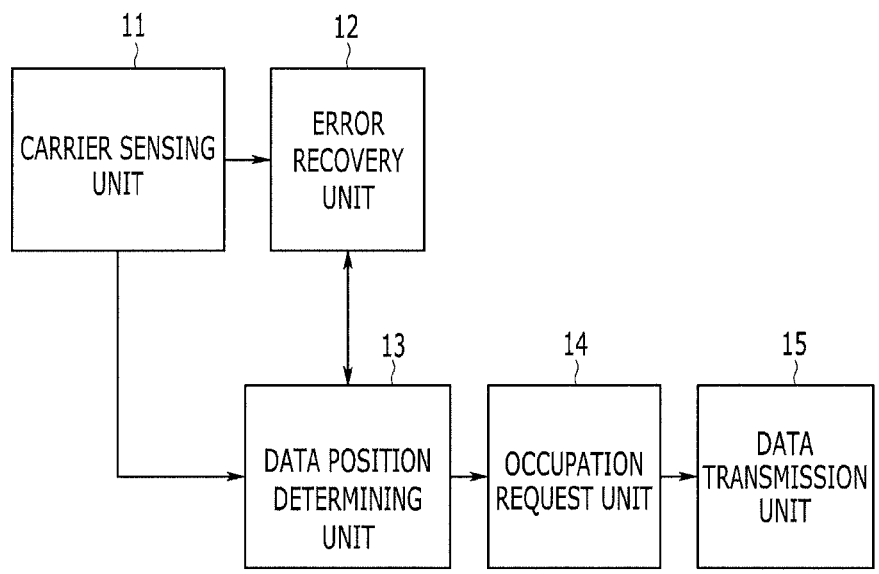
FIG. 8 illustrates a transmitting apparatus in accordance with an exemplary embodiment of the present invention.

FIG. 8 illustrates a transmitting apparatus in accordance with an exemplary embodiment of the present invention.

Referring to FIG. 8, the transmitting apparatus 10 includes a carrier sensing unit 11, an error recovery unit 12, a data position determining unit 13, an occupation request unit 14, and a data transmission unit 15. The carrier sensing unit 11 finds an empty slot through sensing ACK slots. The error recovery unit 12 performs a random backoff procedure when there is no empty ACK slot. The occupation request unit 14 transmits an RTS PDU that requests an occupying PDU for data transmission. The data transmission unit 15 transmits data when a CTS PDU is received after transmitting an RTS PDU.

The carrier sensing unit 11 senses an ACK slot in a frame of FIG. 1.

The error recovery unit 12 calculates a random backoff time and delays data transmission until an empty slot appears during the calculated backoff time. Accordingly, the error recovery unit 12 reduces collision with other nodes delaying data transmission. The error recovery unit 12 performs a random backoff procedure when a CTS PDU response is not received after transmitting an RTS PDU slot.

The random backoff time is calculated based on a randomly setup natural number CW and a time of one frame. The error recovery unit 12 sets up a backoff timer according to the calculated random backoff time. The error recovery unit 12 determines whether a time of a backoff timer is "0" or not when an empty ACK slot is included or not included. When the error recovery unit 12 determines that the time of the backoff timer is "0", the error recovery unit 12 requests the data transmission unit 14 to perform a data transmission procedure. Accordingly, the data transmission procedure for transmitting an RTS PDU is performed at a frame where the time of the backoff timer becomes "0".

The data position determining unit 13 determines a position of a PDU slot available for data transmission. Particularly, the data position determining unit 13 may determine a position of a PDU slot for data transmission in consideration of positions of PDU slots available for data transmission, which are obtained from carrier sensing results for an ACK slot for one frame. The transmitting node excludes all frequency domain locations within a time domain in which the transmitting node currently receives data.

The occupation request unit 14 randomly selects an RTS slot and transmits an RTS PDU through the selected RTS slot. The RTS PDU indicates that there is data to be transmitted. The RTS PDU includes an ID of a receiving node, the size of data to be transmitted, and a position of a PDU slot available for data transmission.

The data transmission unit 15 transmits data through PDU slots when the data transmission unit 15 receives a CTS PDU corresponding to the RTS PDU after transmitting the RTS PDU.

Figure 9:
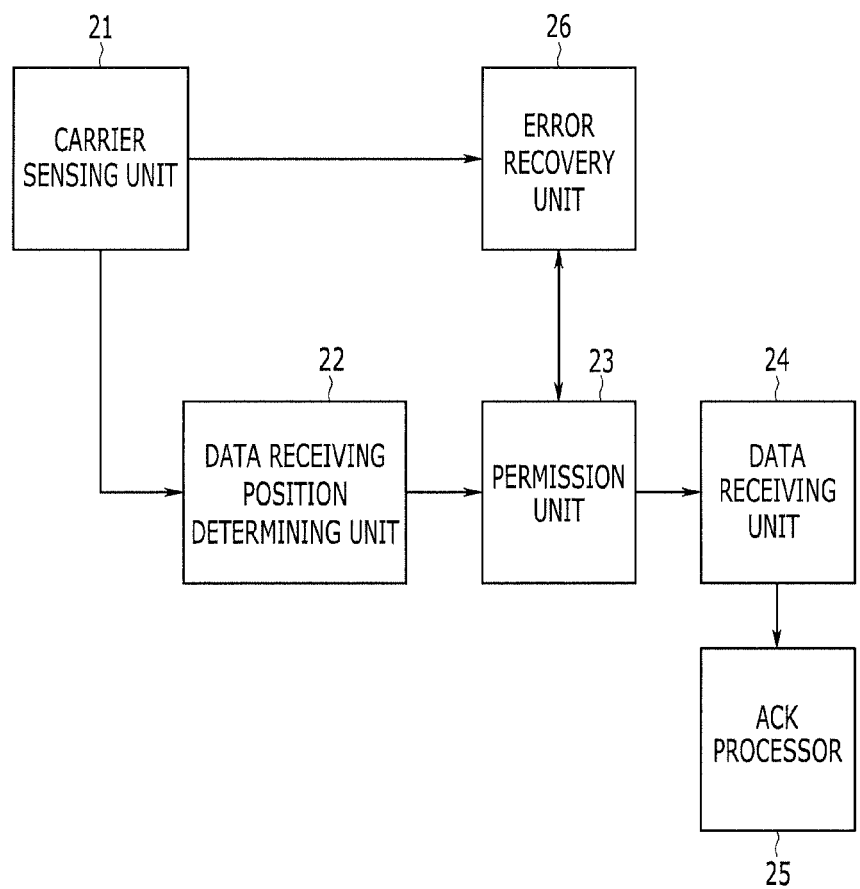
FIG. 9 illustrates a receiving apparatus in accordance with an exemplary embodiment of the present invention.

FIG. 9 illustrates a receiving apparatus in accordance with an exemplary embodiment of the present invention.

Referring to FIG. 9, the receiving apparatus 20 includes a carrier sensing unit 21, a data receiving position determining unit 22, a permission unit 23, a data receiving unit 24, and an ACK processor 25. The carrier sensing unit 21 senses a PDU slot. The data receiving position determining unit 22 determines a position for receiving data. The permission unit 23 transmits a CTS PDU that permits the PDU occupation request when an RTS PDU is received. The data receiving unit 24 receives data. The ACK processor 25 transmits an ACK PDU upon the receipt of data. The receiving apparatus 20 may further include an error recovery unit 26.

The carrier sensing unit 21 senses a PDU slot in a frame having a structure shown in FIG. 1.

The data receiving position determining unit 22 selects PDU slots for receiving data based on a sensing result of the carrier sensing unit 21. The data receiving position determining unit 22 determines PDU slots available or receiving data based on the size of data to be transmitted by a transmitting node and positions of PDU slots available for data transmission, which are included in the received RTS PDU, and based on positions of slots obtained through carrier sensing. The receiving node excludes all frequency domains within a time domain in which the receiving node currently transmits data.

The permission unit 23 determines whether or not an RTS PDU is received, determines PDU slots for receiving data when the RTS PDU is received, includes information on the positions for determined PDU slots in a CTS PDU, and transmits the CTS PDU. A CTS PDU is transmitted through a CTS slot corresponding to an RTS slot where an RTS PDU is received.

The data receiving unit 24 receives data. Particularly, the data receiving unit 24 receives data PDUs received through PDU slots available for data transmission.

The ACK processor 25 transmits an ACK PDU when data is normally received. Particularly, the ACK processor 25 transmits an ACK PDU for each received PDU. The ACK processor 25 transmits an ACK PDU through an ACK slot corresponding to the received PDU slot.

The error recovery unit 26 performs a duplication checking procedure when PDUs are not sequentially received or when duplicated PDUs are received.

Each node may include the transmitting apparatus 10 and the receiving apparatus 20. The transmitting apparatus 10 transmits data using the transmitting method described above, and the receiving apparatus 20 receives data using the receiving data described above.

As described above, the mobile communication system network can eliminate a hidden node problem and an exposed node problem in a mobile wireless network system.

Such effects will be described in more detail with examples.

Figure 10:
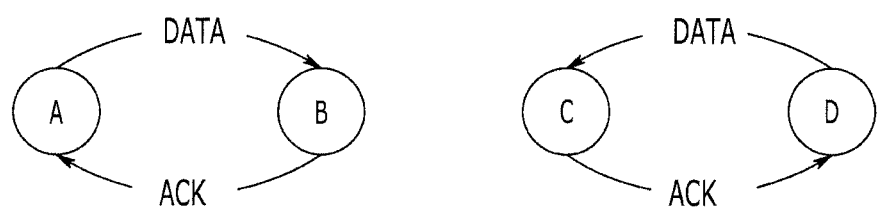
FIG. 10 is a diagram for describing a solution for an exposed node problem and a hidden node problem arisen in a receiving node.
Figure 11:
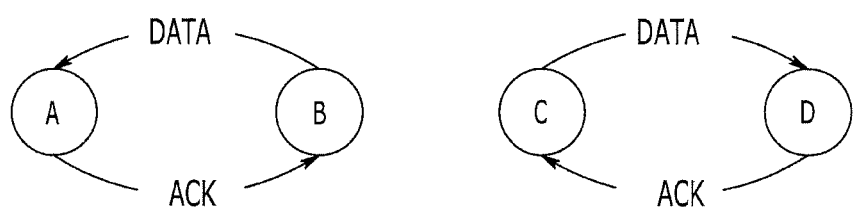
FIG. 11 is a diagram for describing a solution for an exposed node problem and a hidden node problem generated in a transmitting node.

FIG. 10 is a diagram for describing a solution for an exposed node problem and a hidden node problem arisen in a receiving node. FIG. 11 is a diagram for describing a solution for an exposed node problem and a hidden node problem generated in a transmitting node.

As shown in FIG. 10 and FIG. 11, a mobile wireless communication network may include a node A, a node B, a node C, and a node D. The node A may communicate with the node B, and the node C may attempt to communicate with the node D.

The exposed node problem may arise when resource regions are wrongly determined as in use although the resource regions are available for communication.

For example, the exposed node problem may arise when the node B attempts to receive data from the node A while the node C is communicating with the node D as shown in FIG. 10. In order to receive data, the node B performs carrier sensing for an ACK slot. Since the node B searches for ACK slots used for communication between the node C and the node D, the node B determines that PDU slots corresponding to the searched ACK slots are in use as the result of carrier sensing. However, the PDU slots corresponding to the searched ACK slots are actually empty slots. Accordingly, the corresponding resource regions cannot be used although those resource regions are usable resource regions. In accordance with an embodiment of the present invention, the carrier sensing for PDU slots determines PDU slots that are not used for communication between the node C and the node D as empty slots. Accordingly, corresponding resources can be used in accordance with an embodiment of the present invention. As a result, the exposed node problem at the receiving node can be prevented in accordance with an embodiment of the present invention.

When the node B attempts to transmit data, carrier sensing for PDU slots is performed. In this case, PDU slots used for communication between the node C and node D are searched. Accordingly, ACK slots corresponding to the searched PDU slots are determined as in use. However, the ACK slot corresponding to the searched PDU slot is actually an empty slot that can be used for transmitting data. Although the ACK slot is a usable resource region, the ACK slot cannot be used. When carrier sensing for ACK slots is performed in accordance with an embodiment of the present invention as shown in FIG. 11, such ACK slots are determined as empty slots. That is, ACK slots that are not used for communication between the node C and the node D are determined as empty slots. Accordingly, corresponding resources can be used. Therefore, the exposed node problem may be prevented at the transmitting node.

Meanwhile, the hidden node problem may arise due to data collision generated when data is received from a third node while two nodes are communicating with each other.

For example, the hidden node problem may arise when the node B attempts to receive data from the node A while the node C is communicating with the node D as shown in FIG. 10. When the node B performs carrier sensing for ACK slots, the node B searches for ACK slots except ACK slots already used for communication between the node C and the node D. The node B determines PDU slots corresponding to the searched ACK slots as empty slots. That is, the node B may use corresponding resource regions although the PDU slots determined as the empty slot corresponding to the searched ACK slots are actually in use. Accordingly, data collision is generated at respective regions. When carrier sensing for PDU slots is performed in accordance with an exemplary embodiment of the present invention, PDU slots are determined as empty slots except PDU slots used in communication between the node C and the node D. Accordingly, corresponding resources can be used without collision. As a result, the hidden node problem is prevented at the receiving node.

The hidden node problem may also arise when the node B attempts to transmit data as shown in FIG. 11. When the node B performs carrier sensing for PDU slots, the node B searches for PCU slots except PDU slots used in communication between the node C and the node D. As a result, the node B determines the ACK slots corresponding to the searched PDU slots as empty slots. That is, the node B may use corresponding resource regions although the ACK slots determined as empty slots corresponding to the searched PDU slots are actually in use. Accordingly, data collision is generated at respective regions. When carrier sensing for ACK slots is performed in accordance with an exemplary embodiment of the present invention as shown in FIG. 12, ACK slots are determined as empty slots except ACK slots used in communication between the node C and the node D. Accordingly, corresponding resources can be used without collision. Therefore, the hidden node problem is prevented at the transmitting node.

According to an exemplary embodiment of the present invention, data is transmitted or received while controlling access of a terminal based on synchronization in a mobile wireless network system such as a wireless mesh network or a mobile Ad-hoc network system. Accordingly, an exposed node problem and a hidden node problem can be solved.

The apparatus and method according to an exemplary embodiment of the present invention described above can be realized as a program performing functions corresponding to configuration elements of the apparatus and method or as a computer readable recording medium storing the program. Since the realization can be easily implemented by those skilled in the art to which the exemplary embodiment of the present invention pertains, further description will not be provided herein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting data at a node in a mobile wireless network system including a plurality of nodes, the method comprising:
performing carrier sensing for finding empty acknowledgement (ACK) slots in one frame that includes a preamble, a plurality of packet data unit (PDU) slots, a plurality of ACK slots, a plurality of request-to-send (RTS) slots, and a plurality of clear-to-send (CTS) slots, wherein slots of the frame correspond to a plurality of resource regions each of which is divided into a time domain and a frequency domain;
determining positions of PDU slots available for data transmission based on the carrier sensing result;
excluding all frequency domain positions within the time domain where data is currently received from positions of PDU slots corresponding to empty ACK slots; and
transmitting data through the PDU slots corresponding to the determined positions.

2. The method of claim 1, further comprising
selecting an RTS slot randomly from the frame and transmitting an RTS PDU through the selected RTS slot, wherein the RTS PDU indicates that there is data to be transmitted.

3. The method of claim 2, wherein the RTS PDU includes an ID of a receiving node, the size of data to be transmitted, and positions of PDU slots available for data transmission.

4. The method of claim 2, wherein the transmitting data includes transmitting data through PDU slots available for data transmission when a CTS PDU is received in response to an RTS PDU after transmitting the RTS PDU.

5. The method of claim 2, further comprising
performing a random backoff procedure when a respective frame includes no empty slot based on the carrier sensing result or when the CTS PDU
is not received in response to the RTS PDU.

6. The method of claim 5, wherein the performing a random backoff procedure includes:
setting up a backoff timer according to a random backoff time when a respective frame includes no empty ACK slot;
determining whether or not a respective frame includes an empty ACK slot by performing carrier sensing for the respective frame, and reducing a time of the backoff timer as much as a time of one frame when the respective frame includes the empty ACK slot based on the determination result; and
determining whether or not the time of the backoff timer corresponds with a predetermined value,
wherein an RTS PDU is transmitted when the time of the backoff timer corresponds with the predetermined value in the transmitting an RTS PDU.

7. The method of claim 6, wherein the random backoff time is calculated by multiplying a randomly determined natural number with a time of one frame, and
the method further comprises resetting the backoff timer after transmitting data, and resetting the randomly determined natural number to a predetermined minimum value.

8. A method for receiving data at a node in a mobile wireless network system including a plurality of nodes, the method comprising:
finding an empty packet data unit (PDU) slot through sensing PDU slots in one frame that includes a preamble, a plurality of PDUs, a plurality of acknowledgement (ACK) slots, a plurality of request-to-send (RTS) slots, and a plurality of clear-to-send (CTS) slots, wherein the frame includes resource regions having a time domain and a frequency domain, and the slots are disposed in the time domain and the frequency domain;
determining positions of PDU slots available for receiving data based on the carrier sensing result;
excluding slots corresponding to all frequency domains within a time domain in which the node is transmitting data from empty PDU slots obtained based on the carrier sensing result in the determining of positions; and
receiving data through the PDU slots corresponding to the determined positions.

9. The method of claim 8, further comprising
determining whether or not an RTS PDU is received, and transmitting a CTS PDU when the RTS PDU is received, wherein the CTS PDU includes information on positions for receiving data, which are the determined positions of the PDU slots available for receiving data.

10. The method of claim 9, wherein in the transmitting a CTS PDU, the CTS PDU is transmitted through a CTS slot corresponding to the RTS slot where the RTS PDU is received.

11. The method of claim 9, wherein in the determining positions of PDU slots, PDU slots available for receiving data are determined based on the size of data to be transmitted at a transmitting node and positions of PDU slots available for data transmission, which are included in the received RTS PDU, and based on positions of empty slots obtained by the carrier sensing.

12. The method of claim 8, further comprising
transmitting an ACK PDU through an ACK slot at a position corresponding to the received PDU slot whenever data is received through the PDU slot.

13. A transmitting apparatus of a mobile wireless network system including a plurality of nodes, the transmitting apparatus comprising:
a carrier sensing unit for finding an empty acknowledgement (ACK) slot through sensing ACK slots in one frame that includes a preamble, a plurality of packet data unit (PDU) slots, a plurality of acknowledgement (ACK) slots, a plurality of request-to-send (RTS) slots, and a plurality of clear-to-send (CTS) slots, wherein slots of the frame correspond to a plurality of resource regions each of which is divided into a time domain and a frequency domain;
a data position determining unit for determining positions of PDU slots available for data transmission based on the carrier sensing result, wherein the positions of PDU slots include positions of PDU slots corresponding to empty ACK slots and
excluding all frequency domain positions within the time domain where data is currently received from positions of PDU slots corresponding to empty ACK slots; and
a data transmission unit for transmitting data through the PDU slots available for data transmission and corresponding to the determined positions.

14. The transmitting apparatus of claim 13, further comprising
an occupation request unit for selecting an RTS slot randomly from the frame and transmitting an RTS PDU through the selected RTS slot, wherein the RTS PDU indicates there is data to be transmitted, and wherein the data transmission unit transmits data through PDU slots available for data transmission when a CTS PDU is received in response to an RTS PDU after transmitting the RTS PDU.

15. The transmitting apparatus of claim 13, further comprising an error recovery unit for performing a random backoff procedure when an empty slot is not included in a respective frame based on the carrier sensing result or when a CTS PDU is not received in response to the RTS PDU.

16. A receiving apparatus of a mobile wireless network system including a plurality of nodes, the receiving apparatus comprising:

a carrier sensing unit for finding an empty packet data unit (PDU) slot through sensing PDU slots in one frame that includes a preamble, a plurality of PDU slots, a plurality of acknowledgement (ACK) slots, a plurality of request-to-send (RTS) slots, and a plurality of clear-to-send (CTS) slots wherein the frame includes resource regions having a time domain and a frequency domain, and the slots are disposed in the time domain and the frequency domain; and a data receiving position determining unit for determining positions of PDU slots available for receiving data based on the carrier sensing result, excluding slots corresponding to all frequency domains within a time domain in which the node is transmitting data from empty PDU slots obtained based on the carrier sensing result in the determining of positions, and receiving data through the PDU slots corresponding to the determined positions.

17. The receiving apparatus of claim 16, further comprising a permission unit for determining whether or not an RTS PDU is received, and transmitting a CTS PDU when the RTS PDU is received, wherein the CTS PDU includes information on positions for receiving data, which are the determined positions of the PDU slots from the data receiving position determining unit, wherein the CTS PDU is transmitted through a CTS slot corresponding to an RTS slot where the RTS PDU is received.

18. The receiving apparatus of claim 16, further comprising:

an ACK processor for transmitting an ACK PDU for each PDU received at the data receiving unit, wherein the ACK PDU is transmitted through an ACK slot at a position corresponding to the received PDU slot; and an error recovery unit for performing a duplication checking procedure when PDUs are not sequentially received after transmitting the CTS PDU or when duplicated PDUs are received.

\* \* \* \* \*